(12) United States Patent
Whitehead

(10) Patent No.: US 7,089,668 B1
(45) Date of Patent: Aug. 15, 2006

(54) PLASTIC PIPE CUTTING DEVICE

(76) Inventor: Steven Whitehead, 48 Lambourne Crescent, Newport (GB) NP20 7TZ ( * ) Notice: Subject to any disclaimer, the term of this patent is extended or adjusted under 35 U.S.C. 154(b) by 172 days.

(21) Appl. No.: 10/828,864

(22) Filed: Apr. 21, 2004

(51) Int. Cl.
*B23D 21/10* (2006.01)
(52) U.S. Cl. .............................. 30/94; 7/157
(58) Field of Classification Search ............ 30/92, 30/93, 94, 95, 96; 82/113; 7/157, 158
See application file for complete search history.

(56) References Cited

U.S. PATENT DOCUMENTS

| | | | |
|---|---|---|---|
| 3,103,140 A * | 9/1963 | Connelly | 82/131 |
| 4,270,269 A * | 6/1981 | Weil et al. | 7/158 |
| 4,368,577 A | 1/1983 | Babb | |
| 5,046,250 A | 9/1991 | Huang | |
| 5,081,768 A * | 1/1992 | Brennan et al. | 30/96 |
| 5,159,756 A | 11/1992 | McGuire | |
| 6,666,062 B1 * | 12/2003 | Dole et al. | 72/121 |

* cited by examiner

*Primary Examiner*—Stephen Choi

(57) ABSTRACT

A plastic pipe cutting device for both cutting and filing a plastic pipe has a semi-circular top sleeve and bottom sleeve. A top guide track is connected to the top sleeve and a bottom guide track is connected to the bottom sleeve. The top guide track and the bottom guide track are continuous upon closing the device. A guide roller is rotatably connected to the roller housing and is capable of rolling upon the top and bottom guide track. A blade is connected to the roller housing for cutting a plastic pipe. A rasp is connected to the roller housing for filing the end of a plastic pipe.

19 Claims, 2 Drawing Sheets

PLASTIC PIPE CUTTING DEVICE

BACKGROUND OF THE INVENTION

1. Field of the Invention

The present embodiment of the invention relates to a plastic pipe cutting device for use in connection with cutting devices. The plastic pipe cutting device has particular utility in connection with plastic pipe cutting devices that debur while cutting.

2. Description of the Prior Art

Plastic pipe cutting devices are desirable for quickly assembling tubing or pipe for use as plumbing. Currently plastic pipe is cut and a deburring step is subsequently done for joints to mate and for no flash material to flow within the pipe that could cause clogging. A need was felt for a plastic pipe cutting device that would both debur the edges so that the cut piece could be immediately used.

The use of cutting devices is known in the prior art. For example, U.S. Pat. No. 5,159,756 to McGuire discloses a pipe cutting apparatus is provided for cutting a hole or 'window' in the wall of a pipe, for example prior to joining a branch pipe to a host pipe. The apparatus comprises a chassis frame carrying a cutter unit supporting a cutter tool. The chassis is attached to and movable around the pipe by means of 'roller' chains. The cutter unit is movable with respect to the chassis frame by means of the associated slider block which is slidable along longitudinally extending chassis frame members. Thus, the cutter tool can be moved relative to the workpiece in one sense by movement of the chassis frame and in another sense by movement of the cutter tool relative to the chassis frame. A combination of such movements enable the hole or 'window' to be cut. However, the McGuire '756 patent does not both cut and debur the cut portion of pipe.

Similarly, U.S. Pat. No. 5,046,250 to Huang discloses a pipe cutting device includes a body. A mouth is formed in the front end of the body for receiving a pipe to be cut. A cutter is received in the body and is movable toward the mouth. A gear and an upper end of a handle are pivotally coupled to the body. The gear is engaged with the cutter and is caused to rotate when the handle is pulled so that the cutter can be caused to move forward by the rotation of the gear in order to cut the pipe. The pipe can be cut neatly and efficiently when the handle is repeatedly pulled and released. However, the Huang '250 patent does not both cut and debur the cut portion of pipe.

Lastly, U.S. Pat. No. 4,368,577 to Babb discloses a hand-held and hand-operated cutting tool particularly well suited for cleanly and quickly cutting plastic pipe or tubing, rubber hose, or the like. The tool has a blade rotatable in increments or steps from a retracted position in which it is enclosed within a housing to a cutoff position in which it cooperates with a stationary anvil so as to sever the article to be cut. A ratchet drive interconnects a movable handle and the blade so as to incrementally drive the blade towards its cutoff position upon manipulation of the handle. A pawl prevents opening of the blade caused by the springiness of the article being cut upon being engaged by the blade. Upon severing of the article, the blade may be readily returned to its retracted position by, for example, releasing a thumb operated locking pawl. However, the Babb '577 patent does not both cut and debur the cut portion of pipe.

While the above-described devices fulfill their respective, particular objectives and requirements, the aforementioned patents do not describe a plastic pipe cutting device that allows plastic pipe cutting devices that debur while cutting.

The McGuire '756, Huang '250 and Babb '577 patents make no provision for both cut and debur the cut portion of pipe.

Therefore, a need exists for a new and improved plastic pipe cutting device which can be used for plastic pipe cutting devices that debur while cutting. In this regard, the present embodiment of the invention substantially fulfills this need. In this respect, the plastic pipe cutting device according to the present embodiment of the invention substantially departs from the conventional concepts and designs of the prior art, and in doing so provides an apparatus primarily developed for the purpose of plastic pipe cutting devices that debur while cutting.

SUMMARY OF THE INVENTION

In view of the foregoing disadvantages inherent in the known types of cutting devices now present in the prior art, the present embodiment of the invention provides an improved plastic pipe cutting device, and overcomes the above-mentioned disadvantages and drawbacks of the prior art. As such, the general purpose of the present embodiment of the invention, which will be described subsequently in greater detail, is to provide a new and improved plastic pipe cutting device and method which has all the advantages of the prior art mentioned heretofore and many novel features that result in a plastic pipe cutting device which is not anticipated, rendered obvious, suggested, or even implied by the prior art, either alone or in any combination thereof.

To attain this, the present embodiment of the invention essentially comprises a semi-circular top sleeve and bottom sleeve. A top guide track is connected to the top sleeve and a bottom guide track is connected to the bottom sleeve. The top guide track and the bottom guide track are continuous upon closing the device. A guide roller is rotatably connected to the roller housing and is capable of rolling upon the top and bottom guide track. A blade is connected to the roller housing for cutting a plastic pipe. A rasp is connected to the roller housing for filing the end of a plastic pipe.

There has thus been outlined, rather broadly, the more important features of the embodiment of the invention in order that the detailed description thereof that follows may be better understood and in order that the present contribution to the art may be better appreciated.

The present embodiment of the invention may also include a platform, a clasp, a tension adjuster, a handle, a hinge a top rubber grip and a bottom rubber grip. There are, of course, additional features of the present embodiment of the invention that will be described hereinafter and which will form the subject matter of the claims attached.

Numerous objects, features and advantages of the present embodiment of the invention will be readily apparent to those of ordinary skill in the art upon a reading of the following detailed description of presently preferred, but nonetheless illustrative, embodiments of the present embodiment of the invention when taken in conjunction with the accompanying drawings. In this respect, before explaining the current embodiment of the embodiment of the invention in detail, it is to be understood that the embodiment of the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purposes of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present embodiment of the invention.

It is therefore an object of the present embodiment of the invention to provide a new and improved plastic pipe cutting device that has all of the advantages of the prior art cutting devices and none of the disadvantages.

It is another object of the present embodiment of the invention to provide a new and improved plastic pipe cutting device that may be easily and efficiently manufactured and marketed.

An even further object of the present embodiment of the invention is to provide a new and improved plastic pipe cutting device that has a low cost of manufacture with regard to both materials and labor, and which accordingly is then susceptible of low prices of sale to the consuming public, thereby making such plastic pipe cutting device economically available to the buying public.

Still another object of the present embodiment of the invention is to provide a new plastic pipe cutting device that provides in the apparatuses and methods of the prior art some of the advantages thereof, while both overcoming some of the disadvantages normally associated therewith.

Lastly, it is an object of the present embodiment of the invention is to provide a plastic pipe cutting device for plastic pipe cutting devices that debur while cutting.

These together with other objects of the embodiment of the invention, along with the various features of novelty that characterize the embodiment of the invention, are pointed out with particularity in the claims annexed to and forming a part of this disclosure. For a better understanding of the embodiment of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The embodiment of the invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
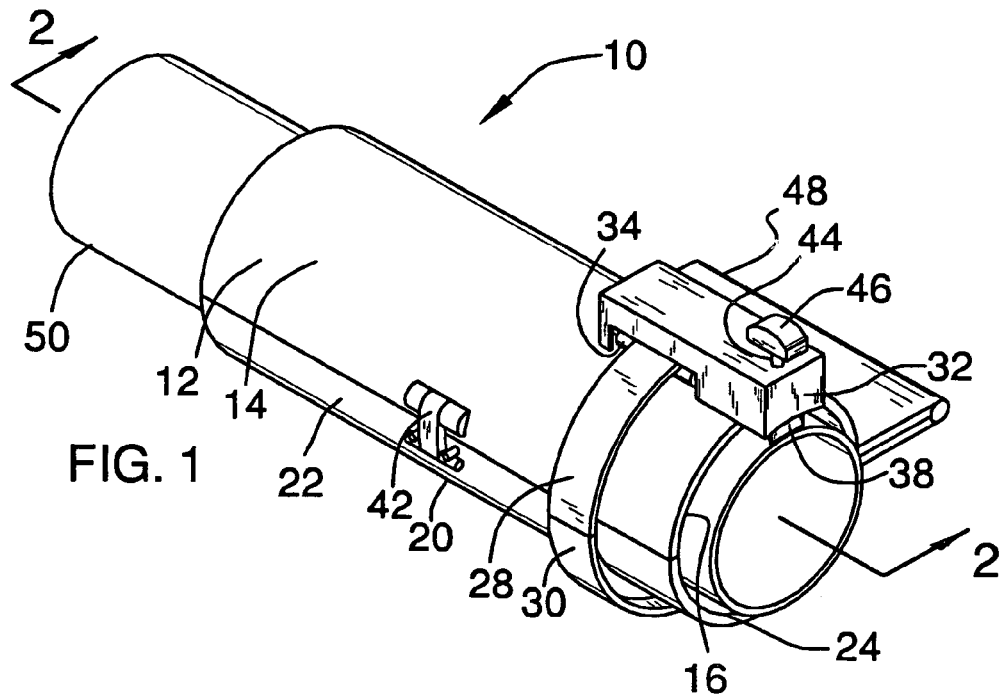
FIG. 1 is a top perspective view of the preferred embodiment of the plastic pipe cutting device constructed in accordance with the principles of the present invention.

Referring now to the drawings, and particularly to FIGS. 1–4, a preferred embodiment of the plastic pipe cutting device of the present invention is shown and generally designated by the reference numeral 10.

In FIG. 1, a new and improved plastic pipe cutting device 10 of the present invention for plastic pipe cutting devices that debur while cutting is illustrated and will be described. More particularly, the plastic pipe cutting device 10 has a top sleeve 12. The top sleeve 12 has the semi-circular cross section. The top sleeve 12 has an exterior 14. The top sleeve 12 has an interior 16. A bottom sleeve 20 is hingedly connected to the top sleeve 12. The bottom sleeve 20 has the semi-circular cross section. The bottom sleeve 20 has an exterior 22. The bottom sleeve 20 has an interior 24. The bottom sleeve 20 is capable of being brought adjacent to the top sleeve 12. A steel top guide track 28 is connected to the top sleeve exterior 14. The top guide track 28 is coaxial to the top sleeve 12. The top guide track 28 has the T-shaped cross section. A steel bottom guide track 30 is connected to the bottom sleeve exterior 22. The bottom guide track 30 is coaxial to the bottom sleeve 20. The bottom guide track 30 has the T-shaped cross section. The bottom guide track 30 and the top guide track 28 form the continuous track when the bottom sleeve 20 is brought adjacent to the top sleeve 12. A guide roller 34 is rotatably connected to a roller housing 32. The guide roller 34 is capable of rolling upon the top guide track 28. The guide roller 34 is capable of rolling upon the bottom guide track 30. A blade 38 is connected to the roller housing 32. The blade 38 is capable of cutting a plastic pipe 50. A clasp 42 is connected to the bottom sleeve 20. The clasp 42 is capable of securing the top sleeve 12 to the bottom sleeve 20. A tension adjuster 44 is threadably connected to the roller housing 32. A handle 46 is connected to the tension adjuster 44. A hinge 48 is connected to the top sleeve 12. The hinge 48 is connected to the bottom sleeve 20. In the present embodiment the plastic pipe cutting device 10 is approximately 10 inches long and can be made in different sized to correspond to the standard sizes of plastic piping.

Figure 2:
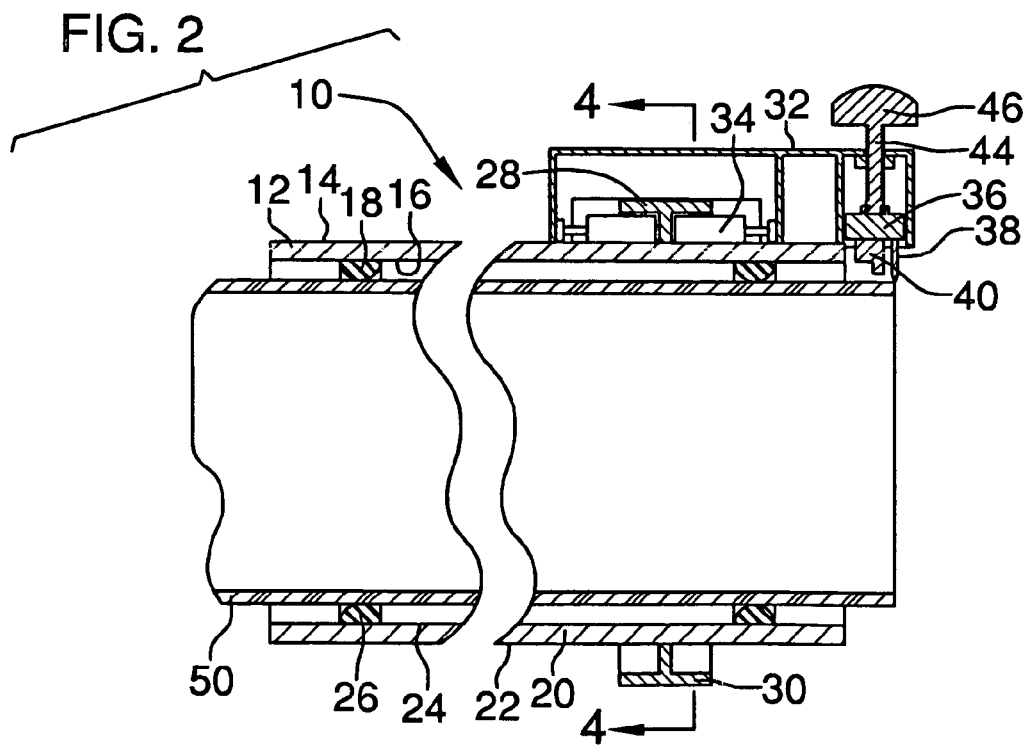
FIG. 2 is a section 2—2 view of FIG. 1 of the plastic pipe cutting device of the present embodiment of the invention.

In FIG. 2, the plastic pipe cutting device 10 while the device is cutting the plastic pipe is illustrated and will be described. More particularly, the plastic pipe cutting device 10 has the top sleeve 12. The top sleeve 12 has the semi-circular cross section. The top sleeve 12 has the exterior 14. The top sleeve 12 has the interior 16. At least one top rubber grip 18 is connected to the top sleeve interior 16. The bottom sleeve 20 is hingedly connected to the top sleeve 12. The bottom sleeve 20 has the semi-circular cross section. The bottom sleeve 20 has the exterior 22. The bottom sleeve 20 has the interior 24. The bottom sleeve 20 is capable of being brought adjacent to the top sleeve 12. At least one bottom rubber grip 26 is connected to the bottom sleeve interior 24. The steel top guide track 28 is connected to the top sleeve exterior 14. The top guide track 28 is coaxial to the top sleeve 12. The top guide track 28 has the T-shaped cross section. The steel bottom guide track 30 is connected to the bottom sleeve exterior 22. The bottom guide track 30 is coaxial to the bottom sleeve 20. The bottom guide track 30 has the T-shaped cross section. The bottom guide track 30 and the to guide track 28 from the continuous track when the bottom sleeve 20 is brought adjacent to the top sleeve 12. The guide roller 34 is rotatably connected to the roller housing 32. The guide roller 34 is capable of rolling upon the top guide track 28. The guide roller 34 is capable of rolling upon the bottom guide track 30. A platform 36 is slidingly connected to the roller housing 32. The blade 38 is connected to the roller housing 32. The blade 38 is capable of cutting the plastic pipe 50. The blade 38 is connected to the platform 36. A rasp 40 is connected to the roller housing 32. The rasp 40 is capable of filing the end of the plastic pipe 50. The rasp 40 is connected to the platform 36. The tension adjuster 44 is threadably connected to the roller housing 32. The handle 46 is connected to the tension adjuster 44.

Figure 3:
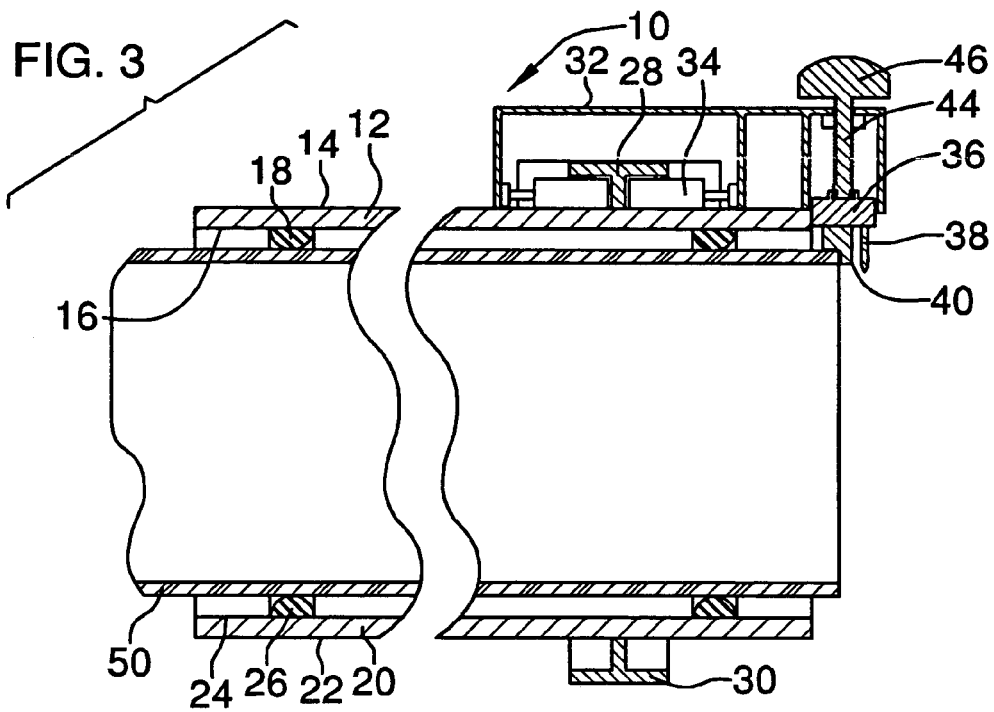
FIG. 3 is a section view of the plastic pipe cutting device of the present embodiment of the invention.

In FIG. 3, the plastic pipe cutting device 10 while the device is filing the plastic pipe end is illustrated and will be described. More particularly, the plastic pipe cutting device 10 has the top sleeve 12. The top sleeve 12 has the semi-circular cross section. The top sleeve 12 has the exterior 14. The top sleeve 12 has the interior 16. The top rubber grip 18 is connected to the top sleeve interior 16. The bottom sleeve 30 is hingedly connected to the top sleeve 12. The bottom sleeve 20 has the semi-circular cross section. The bottom sleeve 20 has the exterior 22. The bottom sleeve 20 has the interior 24. The bottom sleeve 20 is capable of being brought adjacent to the top sleeve 12. The bottom rubber grip 26 is connected to the bottom sleeve interior 24. The steel top guide track 28 is connected to the top sleeve exterior 14. The top guide track 28 is coaxial to the top sleeve 12. The top guide track 28 has the T-shaped cross-section. The steel bottom guide track 30 is connected to the bottom sleeve exterior 22. The bottom guide track 30 is coaxial to the bottom sleeve 20. The bottom guide track 30 has the T-shaped cross section. The bottom guide track 30 and the top guide track 28 has the continuous track when the bottom sleeve 20 is brought adjacent to the top sleeve 12. The guide roller 34 is rotatably connected to the roller housing 32. The guide roller 34 is capable of rolling upon the top guide track 28. The guide roller 34 is capable of rolling upon the bottom guide track 30. The platform 36 is slidingly connected to the roller housing 32. The blade 38 is connected to the roller housing 32. The blade 38 is capable of cutting the plastic pipe 50. The blade 38 is connected to the platform 36. The rasp 40 is connected to the roller housing 32. The rasp 40 is capable of filing the end of the plastic pipe 50. The rasp 40 is connected to the platform 36. The tension adjuster 44 is threadably connected to the roller housing 32. The handle 46 is connected to the tension adjuster 44.

Figure 4:
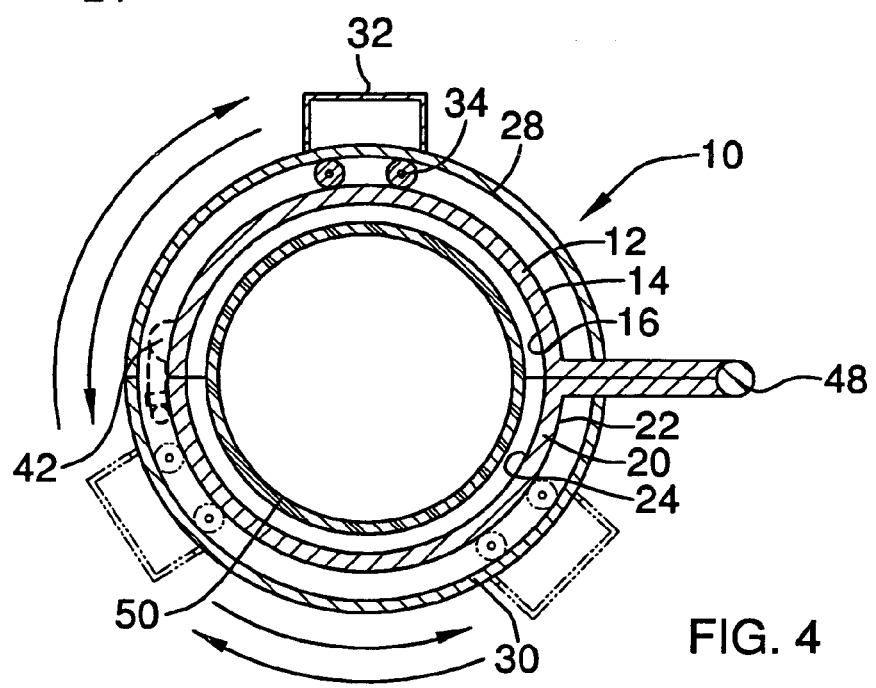
FIG. 4 is a section 4—4 of FIG. 2 view of the plastic pipe cutting device of the present embodiment of the invention.

In FIG. 4, the plastic pipe cutting device 10 is illustrated and will be described. More particularly, the plastic pipe cutting device 10 has the top sleeve 12. The top sleeve 12 has the semi-circular cross section. The top sleeve 12 has the exterior 14. The top sleeve 12 has the interior 16. The bottom sleeve 20 is hingedly connected to the top sleeve 12. The bottom sleeve 20 has the semi-circular cross section. The bottom sleeve 20 has the exterior 22. The bottom sleeve 20 has the interior 24. The bottom sleeve 20 is capable of being brought adjacent to the top sleeve 12. The steel top guide track 28 is connected to the top sleeve exterior 14. The top guide track 28 is coaxial to the top sleeve 12. The top guide track 28 has the T-shaped cross section. The steel bottom guide track 30 is connected to the bottom sleeve exterior 22. The bottom guide track 30 is coaxial to the bottom sleeve 20. The bottom guide track 30 has the T-shaped cross section. The bottom guide track 30 and the top guide track 28 form the continuous track when the bottom sleeve 20 is brought adjacent to the top sleeve 12. The guide roller 34 is rotatably connected to the roller housing 32. The guide roller 34 is capable of rolling upon the top guide track 28. The guide roller 34 is capable of rolling upon the bottom guide track 30. The platform 36 is slidingly connected to the roller housing 32. The clasp 42 is connected to the bottom sleeve 20. The hinge 48 is connected to the top sleeve 12. The hinge 48 is connected to the bottom sleeve 20.

While a preferred embodiment of the plastic pipe cutting device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present embodiment of the invention. For example, any suitable sturdy material such as fiber reinforced plastic may be used instead of the steel described. And although plastic pipe cutting devices that debur while cutting have been described, it should be appreciated that the plastic pipe cutting device herein described is also suitable for cutting metal pipe.

Therefore, the foregoing is considered as illustrative only of the principles of the embodiment of the invention. Further, since numerous modifications and changes will readily occur to those skilled in the art, it is not desired to limit the embodiment of the invention to the exact construction and operation shown and described, and accordingly, all suitable modifications and equivalents may be resorted to, falling within the scope of the embodiment of the invention.

I claim:

1. A plastic pipe cutting device comprising:
   a top sleeve, said top sleeve having a semi-circular cross section, said top sleeve having an exterior, said top sleeve having an interior;
   a bottom sleeve hingedly connected to said top sleeve, said bottom sleeve having a semi-circular cross section, said bottom sleeve having an exterior, said bottom sleeve having an interior, said bottom sleeve capable of being brought adjacent to said top sleeve;
   a top guide track connected to said top sleeve exterior, said top guide track coaxial to said top sleeve, said top guide track having a T-shaped cross section;
   a bottom guide track connected to said bottom sleeve exterior, said bottom guide track coaxial to said bottom sleeve, said bottom guide track having a T-shaped cross section, said bottom guide track and said top guide track forming a continuous track when said bottom sleeve is brought adjacent to said top sleeve;
   a roller housing;
   a guide roller rotatably connected to said roller housing, said guide roller capable of rolling upon said top guide track, said guide roller capable of rolling upon said bottom guide track;
   a blade connected to said roller housing, said blade capable of cutting a plastic pipe; and
   a rasp connected to said roller housing, said rasp capable of filing the end of a plastic pipe.

2. The plastic pipe cutting device of claim 1 further comprising:
   at least one top rubber grip connected to said top sleeve interior; and
   at least one bottom rubber grip connected to said bottom sleeve interior.

3. The plastic pipe cutting device of claim 1 further comprising:
   a clasp connected to said bottom sleeve, said clasp capable of securing said top sleeve to said bottom sleeve.

4. The plastic pipe cutting device of claim 1 further comprising:

a platform slidingly connected to said roller housing.

5. The plastic pipe cutting device of claim 4 wherein: said blade is connected to said platform.

6. The plastic pipe cutting device of claim 4 wherein: said rasp is connected to said platform.

7. The plastic pipe cutting device of claim 1 further comprising:
a tension adjuster threadably connected to said roller housing.

8. The plastic pipe cutting device of claim 7 further comprising:
a handle connected to said tension adjuster.

9. The plastic pipe cutting device of claim 1 further comprising:
a hinge connected to said top sleeve, said hinge connected to said bottom sleeve.

10. The plastic pipe cutting device of claim 1 wherein: said top guide track and said bottom guide track are comprised of steel.

11. A plastic pipe cutting device comprising:
a top sleeve, said top sleeve having a semi-circular cross section, said top sleeve having an exterior, said top sleeve having an interior;
at least one top rubber grip connected to said top sleeve interior;
a bottom sleeve hingedly connected to said top sleeve, said bottom sleeve having a semi-circular cross section, said bottom sleeve having an exterior, said bottom sleeve having an interior, said bottom sleeve capable of being brought adjacent to said top sleeve;
at least one bottom rubber grip connected to said bottom sleeve interior;
a top guide track connected to said top sleeve exterior, said top guide track coaxial to said top sleeve, said top guide track having a T-shaped cross section;
a bottom guide track connected to said bottom sleeve exterior, said bottom guide track coaxial to said bottom sleeve, said bottom guide track having a T-shaped cross section, said bottom guide track and said top guide track forming a continuous track when said bottom sleeve is brought adjacent to said top sleeve;
a roller housing;
a guide roller rotatably connected to said roller housing, said guide roller capable of rolling upon said top guide track, said guide roller capable of rolling upon said bottom guide track;
a blade connected to said roller housing, said blade capable of cutting a plastic pipe; and
a rasp connected to said roller housing, said rasp capable of filing the end of a plastic pipe; and
a clasp connected to said bottom sleeve, said clasp capable of securing said top sleeve to said bottom sleeve.

12. The plastic pipe cutting device of claim 11 further comprising:
a platform slidingly connected to said roller housing.

13. The plastic pipe cutting device of claim 12 wherein: said blade is connected to said platform.

14. The plastic pipe cutting device of claim 13 wherein: said rasp is connected to said platform.

15. The plastic pipe cutting device of claim 14 further comprising:
a tension adjuster threadably connected to said roller housing.

16. The plastic pipe cutting device of claim 15 further comprising:
a handle connected to said tension adjuster.

17. The plastic pipe cutting device of claim 16 further comprising:
a hinge connected to said top sleeve, said hinge connected to said bottom sleeve.

18. The plastic pipe cutting device of claim 17 wherein: said top guide track and said bottom guide track are comprised of steel.

19. A plastic pipe cutting device comprising:
a top sleeve, said top sleeve having a semi-circular cross section, said top sleeve having an exterior, said top sleeve having an interior;
at least one top rubber grip connected to said top sleeve interior;
a bottom sleeve hingedly connected to said top sleeve, said bottom sleeve having a semi-circular cross section, said bottom sleeve having an exterior, said bottom sleeve having an interior, said bottom sleeve capable of being brought adjacent to said top sleeve;
at least one bottom rubber grip connected to said bottom sleeve interior;
a steel top guide track connected to said top sleeve exterior, said top guide track coaxial to said top sleeve, said top guide track having a T-shaped cross section;
a steel bottom guide track connected to said bottom sleeve exterior, said bottom guide track coaxial to said bottom sleeve, said bottom guide track having a T-shaped cross section, said bottom guide track and said top guide track forming a continuous track when said bottom sleeve is brought adjacent to said top sleeve;
a roller housing;
a guide roller rotatably connected to said roller housing, said guide roller capable of rolling upon said top guide track, said guide roller capable of rolling upon said bottom guide track;
a platform slidingly connected to said roller housing;
a blade connected to said roller housing, said blade capable of cutting a plastic pipe, said blade connected to said platform;
a rasp connected to said roller housing, said rasp capable of filing the end of a plastic pipe, said rasp connected to said platform;
a clasp connected to said bottom sleeve, said clasp capable of securing said top sleeve to said bottom sleeve;
a tension adjuster threadably connected to said roller housing;
a handle connected to said tension adjuster; and
a hinge connected to said top sleeve, said hinge connected to said bottom sleeve.

* * * * *